May 6, 1958

C. L. HEATER ET AL 2,833,227

CAR BODY MOUNTING

Filed May 6, 1953

INVENTORS
Charles L. Heater
Robert B. Cottrell
BY
O. B. Garner
Atty.

May 6, 1958  C. L. HEATER ET AL  2,833,227
CAR BODY MOUNTING
Filed May 6, 1953  2 Sheets-Sheet 2
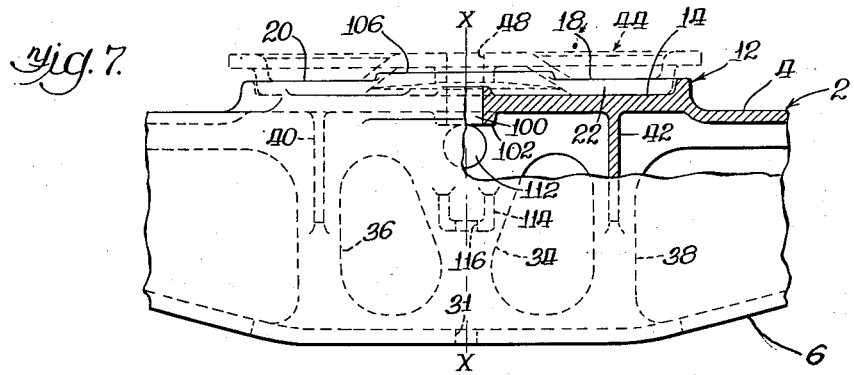
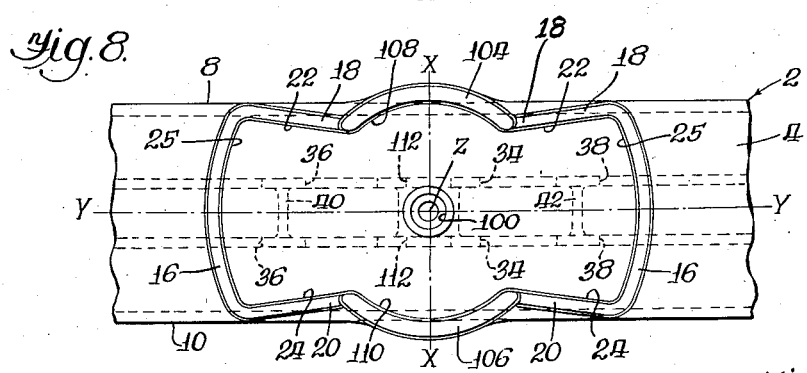
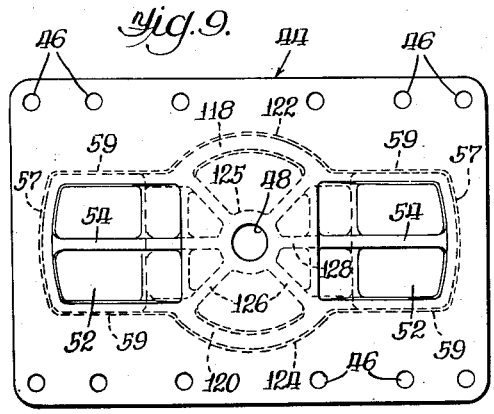
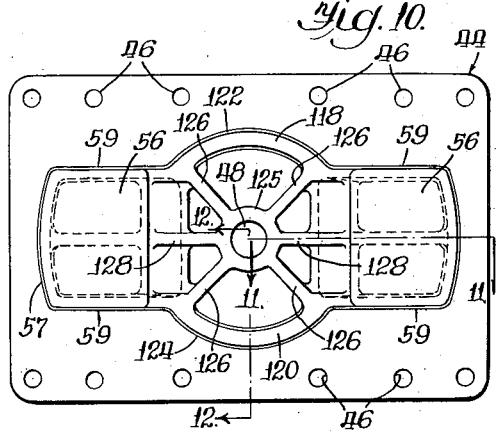
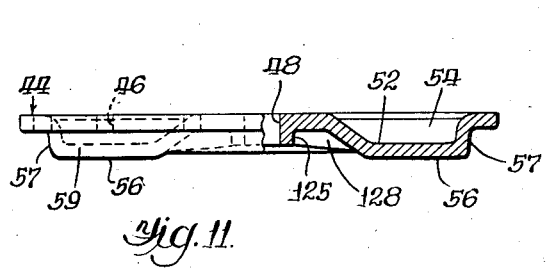
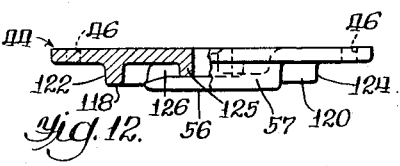
INVENTORS.
Charles L. Heater
Robert B. Cottrell
BY
Atty.

United States Patent Office 2,833,227
Patented May 6, 1958

2,833,227

CAR BODY MOUNTING

Charles L. Heater, Flossmoor, and Robert B. Cottrell, Deerfield, Ill., assignors to American Steel Foundries, Chicago, Ill., a corporation of New Jersey Application May 6, 1953, Serial No. 353,342

14 Claims. (Cl. 105—199)

This invention relates to railway freight cars and more particularly to a novel center bearing arrangement between a car body and truck bolster.

A primary object of the invention is to prevent "nosing" of the car body as frequently occurs in service, due to inadequate control of relative rotational movement between the car body and truck bolster.

A more specific object of the invention is to provide frictional resistance to such relative rotation between the car body and truck bolster at a substantial distance from the axis of rotation to afford adequate control of such rotation.

Still another object of the invention is to devise novel means for limiting such relative rotation between the car body and truck bolster.

A further object of the invention is to devise a novel truck bolster of sturdy and economical construction and capable of providing widely spaced bearing areas for the center bearing portion of the car body.

Another object of the invention is to devise a car body center bearing portion or plate having a king pin opening and having spaced downwardly facing bearing areas at opposite sides of said opening for support by the center bearing of the truck bolster.

A different object of the invention is to eliminate the necessity for conventional side bearings on the truck bolster.

The foregoing and other objects and advantages of the invention will become apparent from a consideration of the following specification and the accompanying drawings, wherein:

Figure 7 is a view corresponding to Figure 1 but illustrating a modification of the invention;

Figure 8 is a top plan view of the truck bolster shown in Figure 7;

Figure 9 is a top plan view of the car body bolster center bearing plate shown in Figure 7;

Figure 10 is a bottom plan view of the plate shown in Figures 7 and 9;

Figure 11 is an edge elevational view of the plate taken from the top of Figure 10 and partly in section on the line 11—11 thereof, and Figure 12 is another edge elevational view of the plate taken from the right of Figure 10 and partly in section on the line 12—12 thereof.

Figure 1:
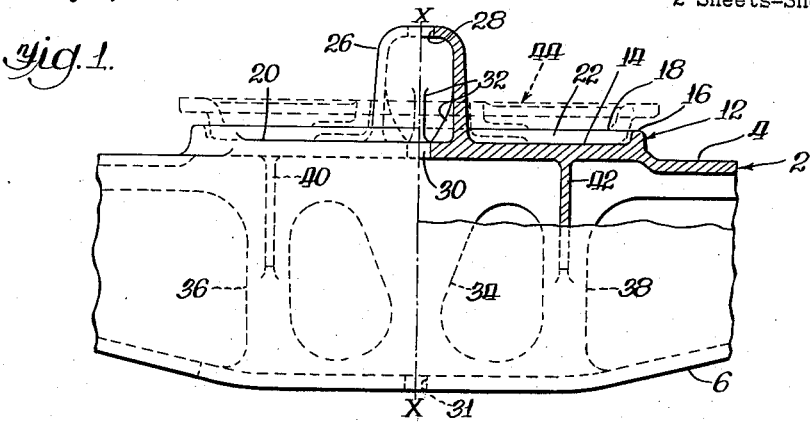
Figure 1 is a fragmentary side view of a truck bolster embodying the invention with the car body center bearing plate shown in phantom lines seated on the center bearing of the bolster, the left half of the bolster being shown in side elevational view, and the right half of the bolster being partly broken away in vertical section.

Describing the invention in detail and referring first to the embodiment illustrated in Figures 1 to 6, inclusive, the novel bearing arrangement comprises a truck bolster generally designated 2 having conventional end portions (not shown) supported in the usual manner as, for example, by conventional truck side frames (not shown) which ordinarily resiliently support each end of the bolster 2.

The bolster 2 comprises top and bottom webs 4 and 6 which are interconnected by spaced side walls 8 and 10 to define a box section. The top wall is elevated to define a novel center bearing generally designated 12, said bearing having an elongated, preferably flat, top area 14, the ends of which are preferably bounded by upstanding arcuate ribs 16, each of which joins corresponding ends of a pair of converging ribs 18 and 20. The ribs 18 and 20 of each pair join the corresponding ends of the other pair of ribs 18 and 20 at approximately the transverse vertical center plane of the bolster indicated at X—X in Figures 1 and 2. The ribs 18 and 20 are provided on their inner, mutually facing sides with stop surfaces 22 and 24, and the ribs 16 are provided on their inner, mutually facing sides with concave bearing surfaces 25 serving a purpose hereinafter described.

The top web 4 of the bolster is also provided centrally of the bearing area 14 with an upwardly tapering integral king pin 26 although, if desired, a conventional removable king pin may be used, as hereinafter discussed in connection with Figures 7–12. The king pin 26 is preferably hollow and is cored away as at 28 for convenient foundry practice. The top and bottom webs 4 and 6 of the bolster are also similarly cored away as at 30 and 31, respectively, beneath the cored opening 28. The hollow king pin 26 is internally reinforced by a plurality of ribs 32 which merge with the top web 4 of the bolster around the circumference of the cored opening 30.

Figure 2:
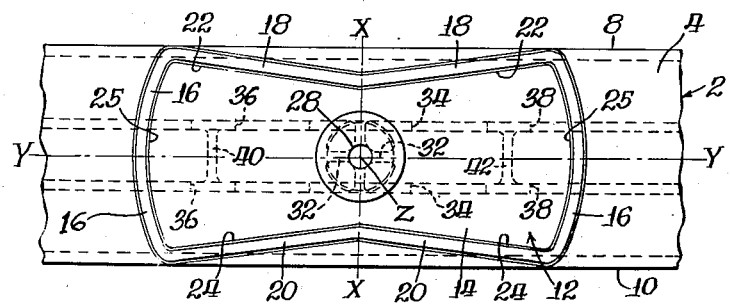
Figure 2 is a top plan view of the bolster shown in Figure 1.
Figure 3:
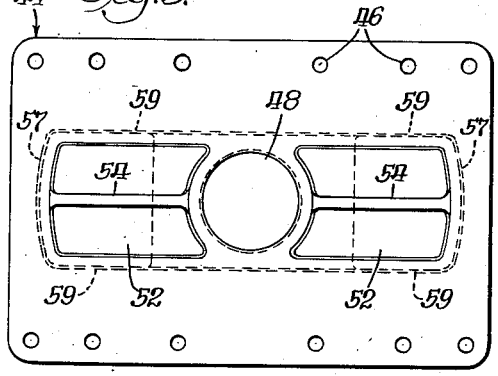
Figure 3 is a top plan view of the car body bolster center bearing plate.

The bolster is internally reinforced by a pair of center struts 34 interconnecting the webs 4 and 6 beneath the king pin 26, said struts being disposed at the opposite sides of the longitudinal vertical center plane Y—Y of the bolster, as shown in Figure 2. Each strut 34 is also connected to struts 36 and 38 which interconnect the top and bottom bolster webs 4 and 6 beneath the center bearing 12 at the ends thereof, said struts being arranged in pairs and being disposed at opposite sides of the plane Y—Y, as best seen in Figure 2. The struts 36 are interconnected by a rib 40 which joins the underside of the web 4 beneath the bearing surface 14 of the center bearing 12. The struts 38 are also arranged in pairs at opposite sides of the plane Y—Y and are interconnected by a rib 42 which joins the underside of the bolster web 4 beneath the bearing surface 14 of the center bearing 12.

The center bearing 12 affords support for a center bearing portion or plate 44 of a car body bolster (not otherwise shown) which may be integral with the plate 44 or may be attached thereto as by rivets (not shown) extending through holes 46 in the plate 44. The plate comprises a central opening 48 and spaced depressed portions 52 reinforced by ribs 54. The depressed portions of the plate 44 are provided with downwardly facing bearing areas 56 spaced a substantial distance from the opening 48 at opposite sides thereof, as best seen in Figures 4 and 5, the bearing areas 56 being adapted for slidable support by the upwardly facing bearing area 14 of the truck bolster center bearing 12 when the plate 44 is seated thereon with the king pin 26 extending through the opening 48, as illustrated by phantom lines in Figure 1.

Thus it will be understood that the interengagement of the bearing areas 56 with the area 14 of the truck bolster center bearing 12 is such that the frictional resistance along these areas of interengagement to relative rotation between the truck bolster 2 and the car body portion 46 substantially on the vertical axis Z of the bolster 2 is adequate to control such rotation, thereby eliminating or substantially reducing "nosing."

Figure 4:
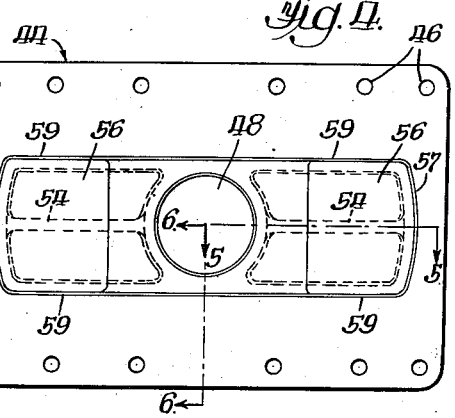
Figure 4 is a bottom plan view of the plate shown in Figure 3.
Figure 5:
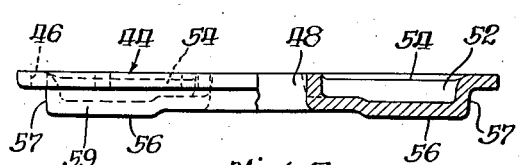
Figure 5 is an edge elevational view of the plate taken from the top of Figure 4 and partly in section on the line 5—5 thereof.

Such relative rotation between the car body bearing plate 44 and truck bolster 2 is guided by convex surfaces 57 bounding the remote edges of areas 56 and cooperating with the before mentioned surfaces 25, and such rotation is limited by substantially parallel abutment faces 59 on each depressed portion 52 of the plate 44 bounding opposite sides of the related bearing area 56, as best seen in Figure 4. Thus relative rotation between the plate 44 and truck bolster 2 in one direction is limited by engagement of one surface 22 and the diagonally opposite surface 24 with the related faces 59 of the plate; and relative rotation between the plate 44 and truck bolster 2 in the opposite direction is limited by engagement of the other surface 22 and the other surface 24 with the related abutment faces 59 of the plate 44. It may be further noted that the parallel relationship of each pair of surfaces 59, in combination with the converging relationship of each pair of surfaces 22 and 24 affords substantially flat face engagement between the faces 59 and the surfaces 22 and 24 to limit such relative rotational movement between the plate 44 and truck bolster 2.

It will be readily understood by those skilled in the art, that if desired, the bearings 12 and 44 may be reversed, so that the bearing 12 is provided on the body bolster and the bearing 44 is provided on the truck bolster.

Referring now to the embodiment of Figures 7 to 12, inclusive, wherein parts corresponding to those described in connection with Figures 1 to 6 are identified by corresponding numerals, it will be understood that the integral king pin 26 of the truck bolster 2 is eliminated and is replaced by an opening 100 through a boss 102 of the top bolster web 4 centrally of its bearing surface 14, said opening 100 being adapted for reception of a conventional removable king pin (not shown). Also in the embodiment of Figures 7 and 8, the ribs 18 and 20 terminate at opposite sides of the transverse vertical center plane X—X of the truck bolster 2, the ribs 18 being interconnected by an arcuate rib 104 integrally formed on the top bolster web 4, and the ribs 20 being similarly interconnected by an arcuate rib 106, said ribs 104 and 106 presenting concave bearing areas 108 and 110, respectively, for a purpose hereinafter described.

It may also be noted in Figures 7 and 8 that the center struts 34 are provided with cored openings 112 adjacent their upper ends to afford access to the removable king pin (not shown) extending through the opening 100; and the center struts 34 are reinforced by an interconnecting U-shaped rib 114 having a cored opening 116.

Figure 6:
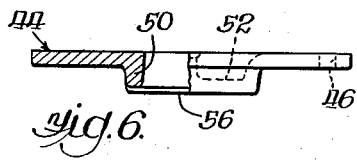
Figure 6 is another edge elevational view of the plate taken from the right of Figure 4 and partly in section on the line 6—6 thereof.

Referring now to the embodiment of the car body bolster center bearing portion or plate 44, shown in Figures 9 to 12, it will be seen that the opening 48 is reduced in diameter as compared with that in the embodiment of Figures 1 and 6 and is substantially of the same diameter as the bolster opening 100 to accommodate the conventional removable king pin (not shown), as heretofore described. The plate 44 is also provided with depending arcuate ribs 118 and 120 having convex bearing surfaces 122 and 124 adapted to engage the before mentioned surfaces 108 and 110 to guide the plate 44 during rotation relative to the truck bolster 32 substantially on the vertical axis Z of the latter, as heretofore described in connection with the preceding embodiment.

The ribs 118 and 120 are reinforced by radial ribs 126 merging with a flange 125 around the opening 48, said flange 125 being additionally reinforced by depending ribs 128, as best seen in Figures 10 and 11.

Referring again to Figure 7, it will be seen that the plate 44 engages the truck bolster center bearing 12 along bearing areas 56 widely spaced at opposite sides of the king pin openings 100 and 48 to afford adequate frictional control of relative rotation between the plate 44 and truck bolster 2, substantially on the vertical axis of the latter.

As in the preceding embodiment, the bearings 12 and 44 may be reversed, with the bearing 12 provided on the body bolster and the bearing 44 provided on the truck bolster.

We claim:

1. In a railway freight car; the combination of a truck bolster having a center bearing with two pairs of stop surfaces, each pair of surfaces converging toward the other pair, a car body with a bearing portion rotatably seated on said bearing, said portion having two pairs of faces engageable with said surfaces, respectively, to limit relative rotation between said bolster and car body.

2. Structure according to claim 1, wherein the center bearing is provided with concave areas, each joining corresponding surfaces of respective pairs, and wherein the bearing portion is provided with convex areas complementary to and received within the concave areas.

3. Structure according to claim 1, wherein the bearing portion is provided with an opening and the center bearing is provided with an integral upstanding king pin received within said opening.

4. In a railway freight car; the combination of a truck bolster having a center bearing comprising two pairs of converging ribs, and a car body having a bearing portion with spaced downwardly facing bearing areas seated on said center bearing, each of said areas being bounded by substantially parallel abutment faces engageable with the related ribs to limit relative rotational movement between the car body and truck bolster.

5. In a railway freight car; the combination of a truck bolster having a center bearing, and a car body having a center bearing, one of said bearings having spaced bearing areas at opposite sides, respectively, of the transverse vertical center plane of said bolster and slidably engaged with the other bearing, each of said bearing areas being bounded at its sides by substantially parallel abutment faces, and said other bearing being partially bounded by two pairs of converging surfaces engageable with the related faces to limit relative rotation between the bolster and car body.

6. Structure according to claim 5, wherein the first mentioned bearing is provided with an integral upstanding king pin on the vertical axis of the bolster, said king pin being received within a complementary opening of the car body center bearing between said bearing areas.

7. Structure according to claim 5, wherein said other bearing is partially bounded by arcuate concave surfaces joining corresponding surfaces of said pairs, and wherein said one bearing is provided with convex surfaces between the concave surfaces and engageable therewith to guide the car body during relative rotation thereof with respect to the truck bolster.

8. In a railway freight car; the combination of a truck bolster having an elongated center bearing extending lengthwise thereof, a car body having another elongated bearing seated on said center bearing on spaced areas of one of said bearings at opposite ends of said one bearing respectively, and stop means presented by said car body bearing engageable with abutment surfaces presented by said bolster bearing to limit relative rotational movement between the truck bolster and the car body.

9. Structure according to claim 8, wherein the ends of the center bearing are defined by arcuate ribs having concave inner surfaces and wherein the ends of the bearing areas are bounded by convex faces enegageable with the surfaces respectively to guide the car body during relative rotation between the car body and bolster.

10. In a railway car truck bolster adapted to support a railway car body; the combination of top and bottom webs, spaced side walls interconnecting said webs, and a center bearing on said top web comprising an upwardly facing seat for a car body, said seat being bounded by two pairs of upstanding ribs converging toward the vertical axis of said bolster, said ribs presenting surfaces abuttably engageable with stop means presented by the car body to limit the rotational movement between the car and the car truck.

11. Structure according to claim 10, wherein corresponding ribs of respective pairs are interconnected by arcuate ribs upstanding from the top web, said arcuate rib having mutually facing concave bearing surfaces.

12. Structure according to claim 10, wherein the ribs of each pair merge with corresponding ribs of the other pair at the transverse vertical center plane of the bolster, and wherein the top web is provided with an integral upstanding king pin disposed substantially on the vertical axis of the bolster.

13. A vehicle body bolster center bearing plate comprising a king pin opening and spaced downwardly facing bearing areas at opposite sides of said opening, each bearing area being bounded at opposite sides thereof by approximately parallel abutment faces adapted to engage related stop means of another vehicle member so as to limit relative rotational movement between the members.

14. Structure according to claim 13, wherein the remote extremities of the bearing areas are bounded by convex arcuate bearing faces.

References Cited in the file of this patent

UNITED STATES PATENTS

| | | |
|---|---|---|
| 1,725,042 | Zimmer | Aug. 20, 1929 |
| 1,912,563 | Allison | June 6, 1933 |
| 1,918,156 | Wallace | July 11, 1933 |
| 2,150,896 | Muchnic | Mar. 21, 1939 |
| 2,161,513 | Hammerstrom | June 6, 1939 |
| 2,258,640 | Beckette | Oct. 14, 1941 |
| 2,655,117 | Travilla | Oct. 13, 1953 |